United States Patent
Wah et al.

(10) Patent No.: US 7,162,024 B2
(45) Date of Patent: Jan. 9, 2007

(54) SYSTEM AND METHOD FOR TELEPHONY CALL CONTROL

(75) Inventors: Allen C. Wah, Plano, TX (US); Joe Q. Vu, Plano, TX (US); Eliot B. Rosen, Plano, TX (US); Thomas A. Cain, Plano, TX (US); Matthew C. Perry, Plano, TX (US); Rajakumar V. Badri, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 1006 days.

(21) Appl. No.: 09/962,914

(22) Filed: Sep. 24, 2001

(65) Prior Publication Data

US 2002/0118814 A1    Aug. 29, 2002

Related U.S. Application Data

(60) Provisional application No. 60/234,861, filed on Sep. 22, 2000.

(51) Int. Cl.
*H04M 7/00*    (2006.01)

(52) U.S. Cl. ............... 379/229; 379/230; 370/352; 370/467

(58) Field of Classification Search ............. None
See application file for complete search history.

(56) References Cited

U.S. PATENT DOCUMENTS

| | | | |
|---|---|---|---|
| 5,239,542 A * | 8/1993 | Breidenstein et al. ....... 370/376 |
| 5,280,625 A | 1/1994 | Howarter et al. |
| 5,940,393 A | 8/1999 | Duree et al. |
| 6,026,091 A | 2/2000 | Christie et al. |
| 6,081,525 A | 6/2000 | Christie et al. |
| 6,147,994 A | 11/2000 | Duree et al. |
| 6,151,390 A * | 11/2000 | Volftsun et al. ............. 379/229 |
| 6,252,952 B1 | 6/2001 | Kung et al. |
| 6,324,179 B1 * | 11/2001 | Doshi et al. ............ 370/395.61 |
| 6,982,993 B1 * | 1/2003 | Claveloux et al. .......... 370/503 |
| 6,563,816 B1 * | 5/2003 | Nodoushani et al. ....... 370/352 |
| 6,718,023 B1 * | 4/2004 | Zolotov ...................... 379/133 |
| 6,915,521 B1 * | 7/2005 | Monteiro ..................... 719/316 |

FOREIGN PATENT DOCUMENTS

| | | |
|---|---|---|
| EP | 0 565 850 A | 10/1993 |
| WO | WO 94 15294 A | 7/1994 |
| WO | WO 94 16387 A | 7/1994 |
| WO | WO 95 29537 A | 11/1995 |
| WO | WO 99 07116 A | 11/1999 |

OTHER PUBLICATIONS

XP-002084334 (Sec. 3.4-3.4.2—pp. 131-148) and (Sec. 5.4-5.5. 1—pp. 320-250).

XP-002084335, pp. 102 and 568-572.

Andrew S. Tanenbaum, Capitol Networks, 1993, Prentice-Hall International Editions, Englewood Cliffs, US.

M. Mouly, M-B Pautet, "GSM—The System for Mobile Communications" 1993—XP002084335.

* cited by examiner

*Primary Examiner*—Creighton Smith
(74) *Attorney, Agent, or Firm*—Haynes and Boone, LLP

(57) ABSTRACT

A telephony call manager includes a call model having call processing logic, and a signaling interface for each respective signaling protocol encountered by the call manager. Each signaling interface is operable to convert call events in each respective signaling protocol to messages of a generic protocol and communicate the messages to the call model.

59 Claims, 2 Drawing Sheets

SYSTEM AND METHOD FOR TELEPHONY CALL CONTROL

RELATED APPLICATIONS

The present application claims priority to patent application Ser. No. 60/234,861, entitled "System and Method for Telephony Call Control", filed on Sep. 22, 2000.

TECHNICAL FIELD OF THE INVENTION

This invention relates to telephony equipment, and more particularly, to a system and method for telephony call control.

BACKGROUND OF THE INVENTION

Telephony equipment today has to have the capability to interface with many different signaling protocols. For example, a call manager in a telecommunications switch is traditionally made up of many equivalent counterparts, each counterpart interfacing with a particular signaling protocol, such as SS7 (Signaling System Number 7), X.25, A/B bearer, and IP (Internet Protocol). Each counterpart of the call manager performed the same functions but with a different signaling protocol. This call manager architecture is problematic for many reasons. Because each counterpart is similar, a logic error made in one is duplicated in each counterpart. Further, a change or update to the call model requires a change to each counterpart of the call manager. With the number of new signaling protocols growing at a steady rate, the number of call model counterparts for each new signaling protocol also increases at the same rate where each new counterpart must be coded and supported. It may be seen that support and maintenance of the call manager becomes tedious and inefficient.

SUMMARY OF THE INVENTION

From the foregoing, it may be seen that an alternative architecture for the call manager is desirable so that the call manager operates in a generic common messaging environment and employ a plurality of signaling interfaces which maps call events in respective signaling protocols to messages in the generic protocol. The call manager becomes easier to update and maintain, particularly when it needs to interface with a new signaling protocol.

In accordance with an embodiment of the present invention, a telephony call manager includes a call model having call processing logic, and a signaling interface for each respective signaling protocol encountered by the call manager. Each signaling interface is operable to convert call events in each respective signaling protocol to messages of a generic protocol and communicate the messages to the call model.

In accordance with another embodiment of the present invention, a method for interfacing a telephony call manager various signaling protocols includes the steps of mapping call events of various signaling protocols to messages of a generic protocol, and communicating the messages to a call model to process the call events.

In accordance with yet another embodiment of the present invention, a method for interfacing a telephony call manager various signaling protocols includes the steps of receiving call events in various signaling protocols from respective signaling interfaces, converting the call events to messages of a generic protocol, and sending the generic protocol messages to a call model. The method further includes receiving generic protocol messages from the call model, converting the generic protocol messages to call events of respective signaling protocols, and sending the call events to the respective signaling interface.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
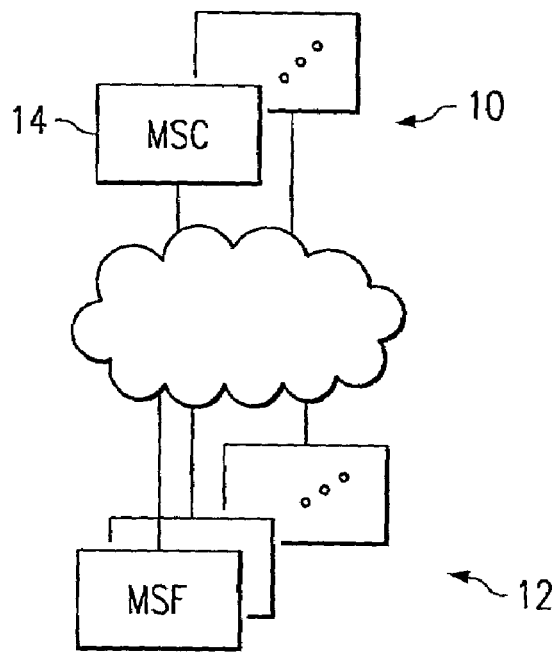
FIG. 1 is a simplified block diagram of an integrated media switching platform according to an embodiment of the present invention.
Figure 3:
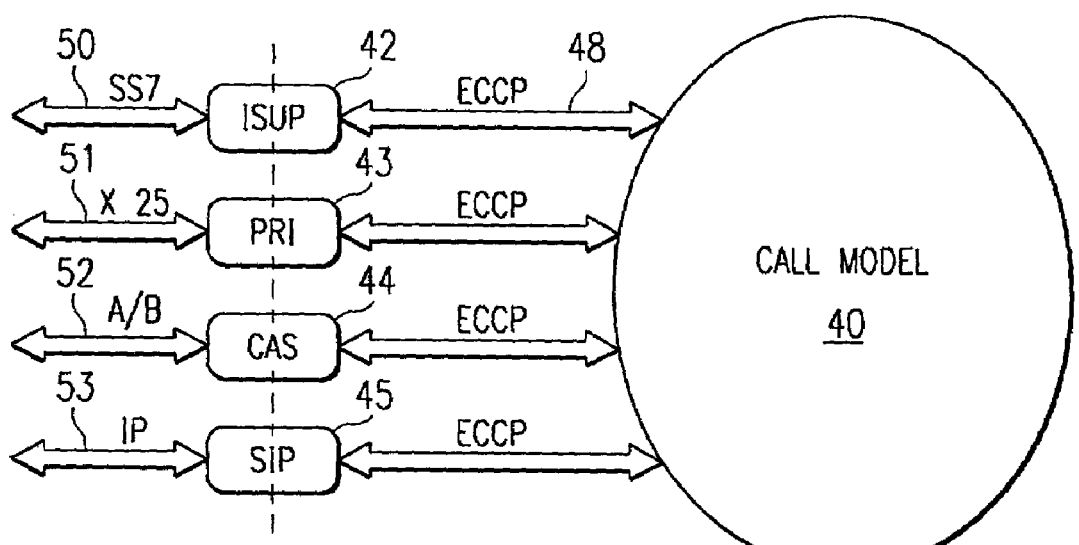
FIG. 3 is a message flow diagram of the call manager according to an embodiment of the present invention.
Figure 2:
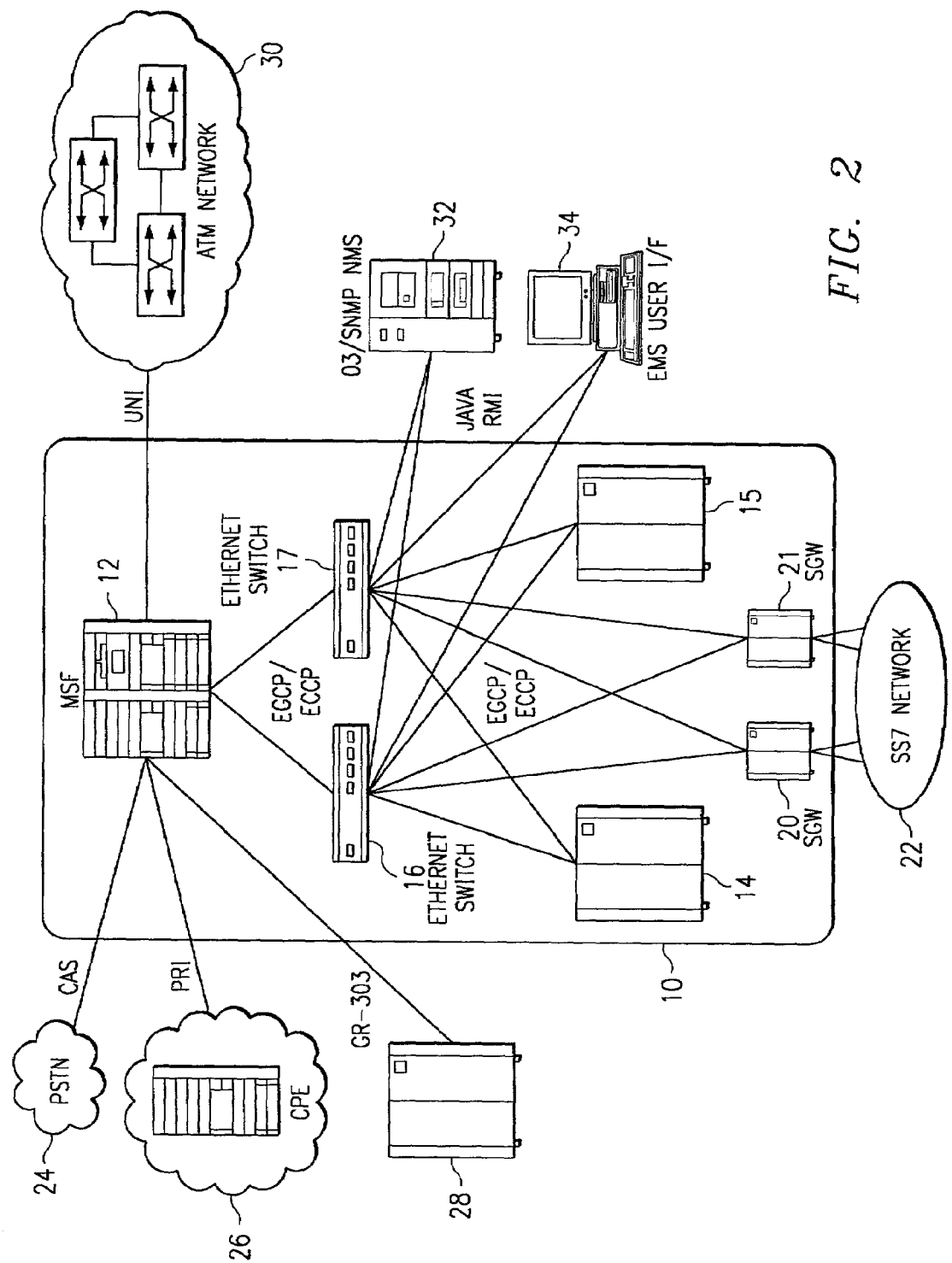
FIG. 2 is a more detailed block diagram of am embodiment of the multi-service switching hub according to the teachings of the present invention.

The preferred embodiment of the present invention and its advantages are best understood by referring to FIGS. 1 through 3 of the drawings, like numerals being used for like and corresponding parts of the various drawings.

FIG. 1 is a simplified block diagram of a distributed processing system 10 set in a telecommunications environment. In particular, system 10 is an integrated media switching platform. System 10 includes one or more multi-service fabric (MSF) 12 coupled to one or more multi-service controllers (MSC) 14 via a network. Multi-service controllers (MSC) 14 perform call processing control and user interface functions for integrated media switching platform 10. Multi-service fabric (MSF) 12 provides the physical resources of a switching fabric for routing telephony calls, video data, facsimile data, Internet traffic, and other data. Multi-service fabric 12 is operable to interface with various signaling protocols, including ISUP (ISDN User Part) SS7 (Signaling System Number 7), GR-303, ISDN (Integrated Services Digital Network) PRI (Primary Rate Interface), in-band signaling, ATM (Asynchronous Transfer Mode), IP (Internet Protocol), and frame relay.

Referring to FIG. 2, a more detailed block diagram of the integrated media switching platform 10 is shown. Multi-service fabric 12 is coupled to multi-service controllers 14 and 15 via a network, or network switches such as Ethernet switches 16 and 17. Multi-service controllers 14 and 15 perform call processing control and user interface functions. Multiple multi-service controllers may be grouped together to form an MSC complex. Multi-service controllers may operate in a load-sharing mode or in an active-standby mode. Multi-service fabric 12 is a switching fabric for routing telephony calls, video data, facsimile data, Internet traffic, and other data. Signaling gateways (SGW) 20 and 21 interface to the SS7 network 22. Multi-service fabric 12 and multi-services controllers 14 and 15 interface with various networks using different signaling protocols, such as the PSTN (public switching telephony network) 24 using CAS (Channel-Associated Signaling) protocol, with customer premises equipment (CPE) 26 such as a private branch exchange (PBX) using PRI signaling protocol, with an integrated digital loop carrier (IDLC) 28 using GR-303 protocol, and with asynchronous transfer mode network 30 using user network interface (UNI). Ethernet switches 16 and 17 also couples multi-service fabric 12 and multi-service controller 14 and 15 with network management system (NMS) 32 using SNMP (simple network management protocol) and element management subsystem (EMS) user interface 34. Ethernet switches 16 and 17 also couple signaling gateways (SGW) 20 and 21 to multi-service controllers 14 and 15.

Multi-service controllers 14 and 15 each includes a call manager. FIG. 3 is a logical block diagram of the call manager according to an embodiment of the present invention. The call manager includes a call model 40 and communicates with other processes in multi-services controller using inter-process messages. ECCP or Extensible Call Control Protocol 48 is a proprietary protocol used for inter-process communications between call model 40 and signaling interfaces such as ISUP 42, PRI 43, CAS 44, and SIP 45. Many other signaling protocols can be easily accommodated using this call manager architectural scheme. Instead of duplicating the call model logic for each signaling protocol, the call events in each signaling protocol is mapped into an ECCP event. For each signaling protocol, a signaling interface is provided which translates or maps between ECCP and each respective signaling protocol call events such as SS7 50, X.25 51, A/B bearer 52, and IP 53. The following provides an exemplary mapping scheme:

| ECCP to ISUP and CAS Mapping | | |
|---|---|---|
| ECCP | ISUP | CAS |
| SETUP | IAM (initial address message) | Originator OFFHOOK, or seizure of terminator |
| CALLPROC | N/A | N/A |
| PROGRESS | N/A | N/A |
| ALERT | ACM (address complete message) | Ringing applied |
| INFO | N/A | Digits have been dialed |
| CONN | ANM (answer message) | OFFHOOK of terminator |
| RESUME | | |
| SUSPEND | | |
| RELEASE | REL (release message) | sent to CM: party ONHOOK, or sent from CM: request release |
| RELCOMP | RLC (release complete message) | sent to CM: party ONHOOK, or sent from CM: acknowledge RELEASE |

| ECCP to SIP Mapping | |
|---|---|
| ECCP | SIP |
| SETUP | Invite |
| CALLPROC | 100 Trying |
| PROGRESS | 183 Progress |
| ALERT | 180 Ringing (if line term) or 183 Progress (if not line term) |
| INFO | Info |
| CONN | 200 OK |
| RESUME | Invite |
| SUSPEND | Invite |
| RELEASE | BYE or CANCEL |
| RELCOMP | 200 OK |

| SIP to ECCP Mapping | |
|---|---|
| SIP | ECCP |
| Invite | SETUP |
| 100 Trying | CALL PROCEEDING |
| 180 Ringing | ALERT |
| 181 Forwarding | ALERT |
| 182 Queued | ALERT |
| 183 Progress | PROGRESS |
| 200 OK | CONNECT |
| 4xx–6xx | RELEASE |
| ACK | N/A |

| -continued | |
|---|---|
| BYE | RELEASE |
| CANCEL | RELEASE |
| INFO | INFO |

The ECCP messages are sent and received for both the originating and terminating parties in a two-party call. The INFO ECCP message is only sent by the originating line interface to the call manager to report the collected digits. In general, each ECCP message has identifier, length, and information element fields. Data content for the signaling messages, such as ISUP parameters, are mapped to the generic ECCP information element fields of the ECCP messages. An information element is an atomic piece of data that are contained in the ECCP messages. For example, called party telephone numbers are contained in the ECCP called party number information element with IA5 data encoding regardless of external representation. Therefore, all data items are normalized to the ECCP view. It may be possible that in mapping call events in certain signaling protocols to ECCP messages, some data are ignored or discarded.

Because BICC is derived from ISUP with an additional APM message, ECCP to BICC mapping is accomplished by adding an additional message, APM, to the ECCP protocol message set to correspond with the APM message in BICC.

Implemented in this manner, the call manager becomes a pure call model driven by ECCP. New signaling protocols can be added to the system by implementing the interface layer between the new signaling protocol and ECCP instead of implementing an entire call model counterpart to interface with the new signaling protocol. Typically, few changes are required to the call manager to support new signaling protocols or interface.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A telephony call manager, comprising:
a call model having call processing logic; and
a signaling interface for each respective one of a plurality of signaling protocols encountered by the call manager, wherein the signaling interfaces are, collectively, configured to:
convert call events in each respective signaling protocol to messages of a generic protocol and communicate the messages to the call model;
convert packet call events from a packet signaling protocol to a PSTN signaling protocol;
convert PSTN call events from a PSTN signaling protocol to a packet signaling protocol; and
convert in-band signaling messages to out-band signaling messages.

2. The telephony call manager, as set forth in claim 1, wherein the generic protocol comprises a call SETUP message mappable to and from the initial address message of the SS7 signaling protocol.

3. The telephony call manager, as set forth in claim 1, wherein the generic protocol comprises a call SETUP message mappable to and from an originator OFFHOOK call event.

4. The telephony call manager, as set forth in claim 1, wherein the generic protocol comprises an ALERT message mappable to and from the address complete message of the SS7 signaling protocol.

5. The telephony call manager, as set forth in claim 1, wherein the generic protocol comprises an ALERT message mappable to and from a ringing applied call event.

6. The telephony call manager, as set forth in claim 1, wherein the generic protocol comprises an INFO message mappable to and from a dialed digits call event.

7. The telephony call manager, as set forth in claim 1, wherein the generic protocol comprises a CONN message mappable to and from the answer message of the SS7 signaling protocol.

8. The telephony call manager, as set forth in claim 1, wherein the generic protocol comprises a CONN message mappable to and from a terminator OFFHOOK call event.

9. The telephony call manager, as set forth in claim 1, wherein the generic protocol comprises a RELEASE message mappable to and from the release message of the SS7 signaling protocol.

10. The telephony call manager, as set forth in claim 1, wherein the generic protocol comprises a RELEASE message mappable to and from a party ONHOOK call event of the SS7 signaling protocol sent to the call model from the SS7 signaling interface.

11. The telephony call manager, as set forth in claim 1, wherein the generic protocol comprises a RELEASE message mappable to and from a request release call event of the SS7 signaling protocol sent from the call model to the SS7 signaling interface.

12. The telephony call manager, as set forth in claim 1, wherein the generic protocol comprises a RELCOMP message mappable to and from the release complete message of the SS7 signaling protocol.

13. The telephony call manager, as set forth in claim 1, wherein the generic protocol comprises a RELCOMP message mappable to and from a party ONHOOK call event of the SS7 signaling protocol sent to the call model from the SS7 signaling interface.

14. The telephony call manager, as set forth in claim 1, wherein the generic protocol comprises a RELCOMP message mappable to and from a acknowledge release call event of the SS7 signaling protocol sent from the call model to the SS7 signaling interface.

15. The telephony call manager, as set forth in claim 1, wherein the generic protocol comprises an INFO message mappable to and from dialed digits call event and the INFO message including an information element containing the dialed digits.

16. The telephony call manager, as set forth in claim 1, wherein the generic protocol comprises messages containing at least one information element containing call data.

17. A telecommunications switch having a call manager, the call manager comprising:
 a call model having call processing logic; and
 a signaling interface for each respective one of a plurality of signaling protocols encountered by the call manager, wherein the signaling interfaces are, collectively, configured to:
  convert call events in each respective signaling protocol to messages of a generic protocol and communicate the messages to the call model;
  convert packet call events from a packet signaling protocol to a PSTN signaling protocol;
  convert PSTN call events from a PSTN signaling protocol to a packet signaling protocol; and
  convert in-band signaling messages to out-band signaling messages.

18. The telecommunications switch, as set forth in claim 17, wherein the generic protocol comprises a call SETUP message mappable to and from the initial address message of the SS7 signaling protocol.

19. The telecommunications switch, as set forth in claim 17, wherein the generic protocol comprises a call SETUP message mappable to and from an originator OFFHOOK call event.

20. The telecommunications switch, as set forth in claim 17, wherein the generic protocol comprises an ALERT message mappable to and from the address complete message of the SS7 signaling protocol.

21. The telecommunications switch, as set forth in claim 17, wherein the generic protocol comprises an ALERT message mappable to and from a ringing applied call event.

22. The telecommunications switch, as set forth in claim 17, wherein the generic protocol comprises an INFO message mappable to and from a dialed digits call event.

23. The telecommunications switch, as set forth in claim 17, wherein the generic protocol comprises a CONN message mappable to and from the answer message of the SS7 signaling protocol.

24. The telecommunications switch, as set forth in claim 17, wherein the generic protocol comprises a CONN message mappable to and from a terminator OFFHOOK call event.

25. The telecommunications switch, as set forth in claim 17, wherein the generic protocol comprises a RELEASE message mappable to and from the release message of the SS7 signaling protocol.

26. The telecommunications switch, as set forth in claim 17, wherein the generic protocol comprises a RELEASE message mappable to and from a party ONHOOK call event of the SS7 signaling protocol sent to the call model from the SS7 signaling interface.

27. The telecommunications switch, as set forth in claim 17, wherein the generic protocol comprises a RELEASE message mappable to and from a request release call event of the SS7 signaling protocol sent from the call model to the SS7 signaling interface.

28. The telecommunications switch, as set forth in claim 17, wherein the generic protocol comprises a RELCOMP message mappable to and from the release complete message of the SS7 signaling protocol.

29. The telecommunications switch, as set forth in claim 17, wherein the generic protocol comprises a RELCOMP message mappable to and from a party ONHOOK call event of the SS7 signaling protocol sent to the call model from the SS7 signaling interface.

30. The telecommunications switch, as set forth in claim 17, wherein the generic protocol comprises a RELCOMP message mappable to and from a acknowledge release call event of the SS7 signaling protocol sent from the call model to the SS7 signaling interface.

31. The telecommunications switch, as set forth in claim 17, wherein the generic protocol comprises an INFO message mappable to and from dialed digits call event and the INFO message including an information element containing the dialed digits.

32. The telecommunications switch, as set forth in claim 17, wherein the generic protocol comprises messages containing at least one information element containing call data.

33. A method for interfacing a telephony call manager with various signaling protocols, comprising:
  converting call events between PSTN and packet signaling protocols by: mapping events of one of the signaling protocols to first messages of a generic protocol, communicating the first messages to a call model, and utilizing the call model to process the call events via the first messages; and
  converting in-band signaling messages to out-band signaling messages by: mapping events of the in-band signaling messages to second messages of the generic protocol, communicating the second messages to the call model, and utilizing the call model to process the in-band signaling messages via the second messages.

34. The method, as set forth in claim 33, wherein the call events are incoming call events, the method further comprising:
  mapping third messages of the generic protocol to outgoing call events of respective ones of the signaling protocols after utilizing the call model to process the incoming call events via the first messages; and
  communicating the outgoing call events to a respective signaling interface.

35. The method, as set forth in claim 33, wherein mapping the call events comprises mapping between a call SETUP message to and from the initial address message of the SS7 signaling protocol.

36. The method, as set forth in claim 33, wherein the mapping the call events comprises mapping between a call SETUP message to and from an originator OFFHOOK call event.

37. The method, as set forth in claim 33, wherein the mapping the call events comprises mapping between an ALERT message to and from the address complete message of the SS7 signaling protocol.

38. The method, as set forth in claim 33, wherein the mapping the call events comprises mapping between an ALERT message to and from a ringing applied call event.

39. The method, as set forth in claim 33, wherein the mapping the call events comprises mapping between an INFO message to and from a dialed digits call event.

40. The method, as set forth in claim 33, wherein the mapping the call events comprises mapping between a CONN message to and from the answer message of the SS7 signaling protocol.

41. The method, as set forth in claim 33, wherein the mapping the call events comprises mapping between a CONN message to and from a terminator OFFHOOK call event.

42. The method, as set forth in claim 33, wherein the mapping the call events comprises mapping between a RELEASE message to and from the release message of the SS7 signaling protocol.

43. The method, as set forth in claim 33, wherein the mapping the call events comprises mapping between a RELEASE message to and from a party ON-HOOK call event of the SS7 signaling protocol sent to the call model from the SS7 signaling interface.

44. The method, as set forth in claim 33, wherein the mapping the call events comprises mapping between a RELEASE message to and from a request release call event of the SS7 signaling protocol sent from the call model to the SS7 signaling interface.

45. The method, as set forth in claim 33, wherein the mapping the call events comprises mapping between a RELCOMP message to and from the release complete message of the SS7 signaling protocol.

46. The method, as set forth in claim 33, wherein the mapping the call events comprises mapping between a RELCOMP message to and from a party ONHOOK call event of the SS7 signaling protocol sent to the call model from the SS7 signaling interface.

47. The method, as set forth in claim 33, wherein the mapping the call events comprises mapping between a RELCOMP message to and from a acknowledge release call event of the SS7 signaling protocol sent from the call model to the SS7 signaling interface.

48. The method, as set forth in claim 33, wherein the mapping the call events comprises mapping between an INFO message to and from dialed digits call event and the INFO message including an information element containing the dialed digits.

49. The method, as set forth in claim 33, wherein the mapping the call events comprises mapping between messages containing at least one information element containing call data and call events.

50. A method for interfacing a telephony call manager with various signaling protocols, comprising:
  receiving first call events in various PSTN signaling protocols from respective ones of various signaling interfaces each corresponding to a respective one of the PSTN signaling protocols;
  converting the call events to first messages of a generic protocol;
  sending the first generic protocol messages to a call model;
  processing the first generic protocol messages via the call model to generate second messages of the generic protocol;
  receiving the second generic protocol messages from the call model;
  converting the second generic protocol messages to second call events of respective packet signaling protocols;
  sending the second call events to respective ones of the signaling interfaces;
  receiving third call events in various packet signaling protocols from respective ones of the signaling interfaces each corresponding to a respective one of the packet signaling protocols;
  converting the third call events to third messages of a generic protocol;
  sending the third generic protocol messages to the call model;
  processing the third generic protocol messages via the call model to generate fourth messages of the generic protocol;
  receiving the fourth generic protocol messages from the call model;
  converting the fourth generic protocol messages to fourth call events of respective PSTN signaling protocols;
  sending the fourth call events to respective ones of the signaling interfaces;
  receiving in-band signaling messages in various signaling protocols from respective ones of the signaling interfaces;
  converting the in-band signaling messages to fifth messages of the generic protocol;
  sending the fifth generic protocol messages to the call model;
  processing the fifth generic protocol messages via the call model to generate sixth messages of the generic protocol;

receiving the sixth generic protocol messages from the call model;

converting the sixth generic protocol messages to out-band signaling messages of respective signaling protocols; and sending the out-band signaling messages to respective ones of the signaling interfaces.

51. The method, as set forth in claim 50, wherein converting the call events comprises converting a call event having call data to a generic protocol message containing an information element having the call data.

52. The method, as set forth in claim 50, wherein converting the call events comprises mapping a call event to a message from a set of generic protocol messages understandable by the call model.

53. The method, as set forth in claim 50, wherein converting the call events comprises mapping a call event to a message indicative of setting up a call in the generic protocol.

54. The method, as set forth in claim 50, wherein converting the call events comprises mapping a call event to a message operable indicative of processing the call in the generic protocol.

55. The method, as set forth in claim 50, wherein converting the call events comprises mapping a call event to a message indicative of address completion in the generic protocol.

56. The method, as set forth in claim 50, wherein converting the call events comprises mapping a call event to an information message containing dialed digits in the generic protocol.

57. The method, as set forth in claim 50, wherein converting the call events comprises mapping a call event to a message indicative of connection made in the generic protocol.

58. The method, as set forth in claim 50, wherein converting the call events comprises mapping a call event to a message indicative of releasing the connection in the generic protocol.

59. The method, as set forth in claim 50, wherein converting the call events comprises mapping a call event to a message indicative of releasing the connection completed in the generic protocol.

* * * * *